US012769415B2

(12) United States Patent
Jung et al.

(10) Patent No.: US 12,769,415 B2
(45) Date of Patent: Oct. 20, 2026

(54) DISPLAY DEVICE, A METHOD OF DRIVING THE SAME, AND A DISPLAY SYSTEM INCLUDING THE DISPLAY DEVICE

(71) Applicant: SAMSUNG DISPLAY CO., LTD., Yongin-si (KR)

(72) Inventors: Keum Dong Jung, Yongin-si (KR); Jang Hui Kim, Yongin-si (KR); Bo Hwan Lee, Yongin-si (KR)

( * ) Notice: Subject to any disclaimer, the term of this patent is extended or adjusted under 35 U.S.C. 154(b) by 0 days.

(21) Appl. No.: 18/589,620

(22) Filed: Feb. 28, 2024

(65) Prior Publication Data

US 2024/0411396 A1 Dec. 12, 2024

(30) Foreign Application Priority Data

Jun. 8, 2023 (KR) ........................ 10-2023-0073571

(51) Int. Cl.
*G06F 3/041* (2006.01)
*G06F 3/0354* (2013.01)
*G06F 3/044* (2006.01)

(52) U.S. Cl.
CPC ...... *G06F 3/04162* (2019.05); *G06F 3/03545* (2013.01); *G06F 3/0441* (2019.05); *G06F 3/0442* (2019.05)

(58) Field of Classification Search
CPC ............. G06F 3/04162; G06F 3/03545; G06F 3/0441; G06F 3/0442
See application file for complete search history.

(56) References Cited

U.S. PATENT DOCUMENTS

| | | | |
|---|---|---|---|
| 7,864,160 | B2 | 1/2011 | Geaghan et al. |
| RE42,738 | E | 9/2011 | Williams |
| 9,616,982 | B2 | 4/2017 | Hollis et al. |
| 10,254,891 | B2 | 4/2019 | Noh |
| 10,268,285 | B2 | 4/2019 | Jung et al. |
| 10,366,264 | B2 | 7/2019 | Kim et al. |
| 10,838,546 | B2 | 11/2020 | Choi |
| 10,936,101 | B2 | 3/2021 | Lee et al. |
| 11,656,729 | B2 | 5/2023 | Park et al. |

(Continued)

FOREIGN PATENT DOCUMENTS

| | | | |
|---|---|---|---|
| KR | 10-2013-0056445 | A | 5/2013 |
| KR | 10-1519225 | B1 | 5/2015 |

(Continued)

OTHER PUBLICATIONS

Non-Final Office Action issued in related U.S. Appl. No. 18/508,163 on Jul. 18, 2024.

(Continued)

*Primary Examiner* — Jonathan A Boyd

(57) ABSTRACT

A display device including: a touch array including a plurality of touch electrodes; and a touch driver configured to sense a touch adjacent to the touch array, wherein the touch driver transmits, to an external device, uplink signals in which different position information are included through at least some of the touch electrodes in a first time period, and receives, from the external device, position information of the external device on the touch array in a second time period after the first time period, and wherein the position information of the external device is calculated by the external device, using the uplink signals.

20 Claims, 14 Drawing Sheets

(56) References Cited

U.S. PATENT DOCUMENTS

| | | | |
|---|---|---|---|
| 11,829,549 | B2 | 11/2023 | Chen et al. |
| 2017/0285771 | A1 | 10/2017 | Jung et al. |
| 2018/0188836 | A1 | 7/2018 | Park |
| 2019/0179475 | A1* | 6/2019 | Seo ........................ G06F 3/0442 |
| 2020/0201505 | A1 | 6/2020 | Jung et al. |
| 2021/0019019 | A1 | 1/2021 | Zhang et al. |
| 2021/0397298 | A1* | 12/2021 | Choi ...................... G06F 3/0412 |
| 2022/0019331 | A1 | 1/2022 | Park et al. |
| 2022/0043537 | A1 | 2/2022 | Lee et al. |
| 2022/0171514 | A1 | 6/2022 | Kim et al. |
| 2022/0334698 | A1* | 10/2022 | Gur ...................... G06F 3/03545 |
| 2023/0236677 | A1* | 7/2023 | Cheng .................. G06F 3/04166 345/179 |
| 2024/0077975 | A1 | 3/2024 | Lee et al. |
| 2024/0153449 | A1 | 5/2024 | Zhong et al. |
| 2024/0370115 | A1 | 11/2024 | Jung et al. |
| 2024/0377909 | A1 | 11/2024 | Jung et al. |

FOREIGN PATENT DOCUMENTS

| | | | |
|---|---|---|---|
| KR | 10-2238697 | B1 | 4/2021 |
| KR | 10-2022-0018364 | A | 2/2022 |
| KR | 10-2364099 | B1 | 2/2022 |
| KR | 10-2409949 | B1 | 6/2022 |
| KR | 10-2022-0112574 | A | 8/2022 |
| KR | 10-2460552 | B1 | 10/2022 |
| KR | 10-2552745 | B1 | 7/2023 |

OTHER PUBLICATIONS

Notice of Allowance issued in cross-referenced U.S. Appl. No. 18/592,254 on Dec. 18, 2025.

* cited by examiner

DISPLAY DEVICE, A METHOD OF DRIVING THE SAME, AND A DISPLAY SYSTEM INCLUDING THE DISPLAY DEVICE

CROSS-REFERENCE TO RELATED APPLICATION

The present application claims priority under 35 U.S.C. § 119 (a) to Korean Patent Application No. 10-2023-0073571, filed on Jun. 8, 2023, in the Korean Intellectual Property Office, the disclosure of which is incorporated by reference herein in its entirety.

TECHNICAL FIELD

The present disclosure generally relates to an electronic device, and more particularly, to a display device including touch electrodes, a method of driving the display device, and a display system including the display device.

DISCUSSION OF RELATED ART

Electronic devices, often equipped with touch panels, enable users to indicate position through touch. In particular, with the rise of mobile electronic devices such as smartphones and tablets, touch panels have become ubiquitous. Recently, there is a growing demand for touch panels to recognize inputs from tools such as active pens in addition to fingers.

In some cases, information about the touch position of an object located above a display is required. While the position and coordinate information of a user may be acquired from a signal transmitted from a satellite, or the location of a person in a building may be identified using indoor positioning technology, these methods struggle to acquire accurate touch position information on the display.

SUMMARY

Embodiments of the present disclosure provide a display device, a method of driving the same, and a display system including the display device, which can efficiently and effectively acquire position information of an external device located above a display.

In accordance with an embodiment of the present disclosure, there is provided a display device including: a touch array including a plurality of touch electrodes; and a touch driver configured to sense a touch adjacent to the touch array, wherein the touch driver transmits, to an external device, uplink signals in which different position information are included through at least some of the touch electrodes in a first time period, and receives, from the external device, position information of the external device on the touch array in a second time period after the first time period, and wherein the position information of the external device is calculated by the external device, using the uplink signals.

In accordance with an embodiment of the present disclosure, there is provided a method of driving a display device including a touch array, the method including: sensing a touch adjacent to the touch array; transmitting, to an external device, uplink signals in which different position information are included through touch electrodes of the touch array in a first time period; and receiving, from the external device, position information of the external device on the touch array, in a second time period after the first time period, wherein the position information of the external device on the touch array is calculated by the external device using the uplink signals.

In accordance with an embodiment of the present disclosure, there is provided a display system including: a display device including a touch array including a plurality of touch electrodes and a touch driver configured to sense a touch adjacent to the touch array; and an external device configured to communicate with the display device through the touch array, wherein the touch driver: transmits, to the external device, uplink signals in which different position information are included through one or more capacitors generated between at least some of the touch electrodes and the external device when the external device is adjacent to the touch array in a first time period; and receives, from the external device, a downlink signal including position information of the external device in a second time period after the first time period, and wherein the external device includes a position sensor configured to calculate the position information of the external device on the touch array, using the uplink signals.

BRIEF DESCRIPTION OF THE DRAWINGS

In the drawings, dimensions may be exaggerated for clarity. It will be understood that when an element is referred to as being "between" two elements, it can be the only element between the two elements, or one or more intervening elements may also be present. Like reference numerals may refer to like elements throughout the specification.

DETAILED DESCRIPTION OF THE EMBODIMENTS

Figure 1:
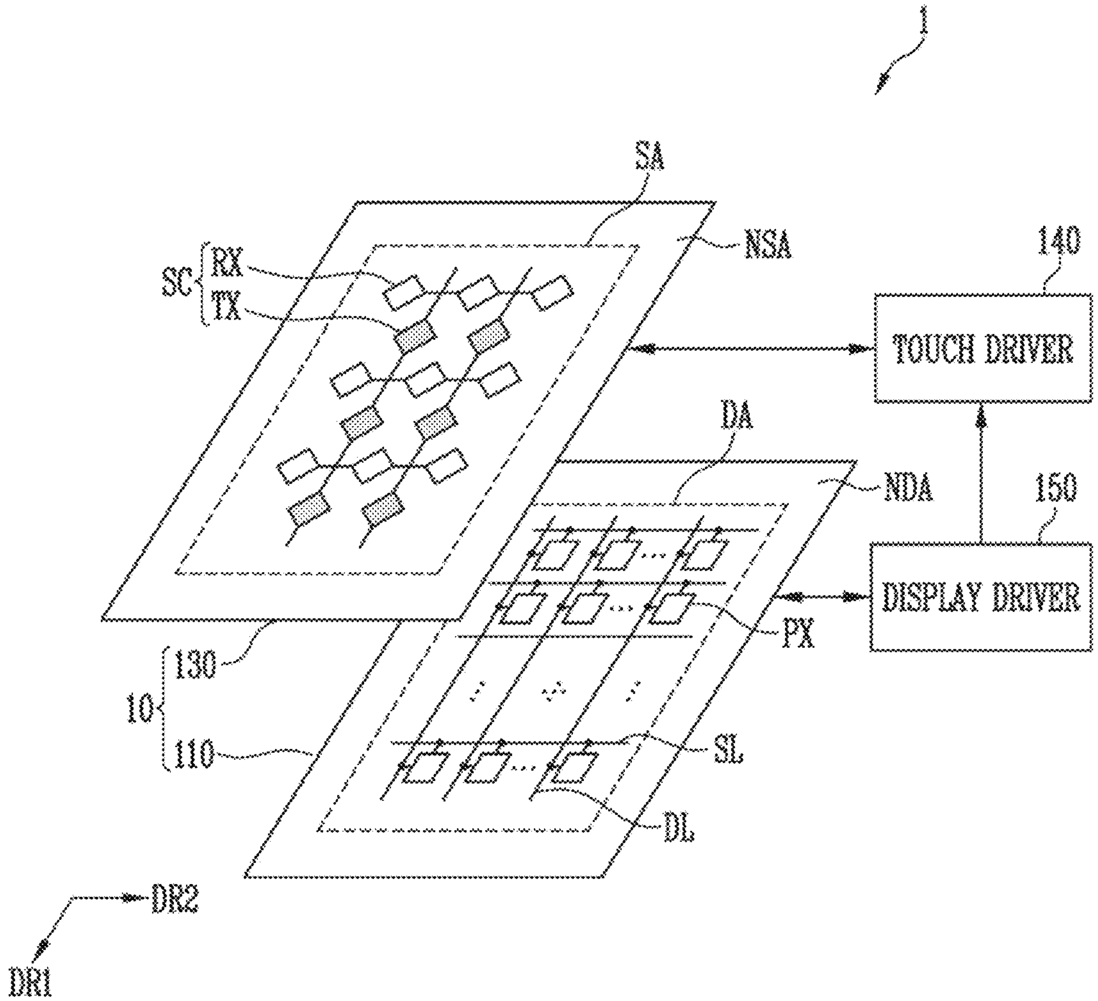
FIG. 1 is a block diagram illustrating a display device in accordance with an embodiment of the present disclosure.

Hereinafter, embodiments of the present disclosure will be described in more detail with reference to the accompanying drawings. In addition, the present disclosure is not limited to the embodiments described herein, but may be embodied in various different forms.

In the specification, when an element is referred to as being "connected" or "coupled" to another element, it can be directly connected or coupled to the another element or be indirectly connected or coupled to the another element with one or more intervening elements interposed therebetween. The technical terms used herein used to describe a specific embodiment are not intended to limit the embodiment. It will be understood that when a component "includes" an element, unless there is another opposite description thereto, it should be understood that the component does not exclude another element but may further include another element. It will be understood that for the purposes of this disclosure, "at least one of X, Y, and Z" can be construed as X only, Y only, Z only, or any combination of two or more items X, Y, and Z (e.g., XYZ, XYY, YZ, ZZ). Similarly, for the purposes of this disclosure, "at least one selected from the group consisting of X, Y, and Z" can be construed as X only, Y only, Z only, or any combination of two or more items X, Y, and Z (e.g., XYZ, XYY, YZ, ZZ).

It will be understood that, although the terms "first", "second," etc. may be used herein to describe various elements, these elements should not be limited by these terms. These terms are simply used to distinguish one element from another element. Thus, a "first" element discussed below could also be termed a "second" element.

Spatially relative terms, such as "below," "above," and the like, may be used herein to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the term, "above," may encompass both an orientation of above and below. The apparatus may be otherwise oriented (e.g., rotated 90 degrees or at other orientations) and the spatially relative descriptors used herein interpreted accordingly.

In addition, the embodiments of the present disclosure are described herein with reference to schematic diagrams of ideal embodiments (and an intermediate structure) of the present disclosure, so that changes in a shape as shown due to, for example, manufacturing technology and/or a tolerance may be expected. Therefore, the embodiments of the present disclosure shall not be limited to the specific shapes of a region shown here, but include shape deviations caused by, for example, the manufacturing technology. The regions shown in the drawings are schematic in nature, and the shapes thereof do not represent the actual shapes of the regions of the device, and do not limit the scope of the present disclosure.

FIG. 1 is a block diagram illustrating a display device 1 in accordance with an embodiment of the present disclosure.

Referring to FIG. 1, a panel 10 may include a display panel 110 and a touch array 130 overlapping the display panel 110.

In some embodiments, after the display panel 110 and the touch array 130 are separately manufactured, the display panel 110 and the touch array 130 may be coupled to at least partially overlap each other. In other embodiments, the display panel 110 and the touch array 130 may be integrally manufactured. The touch array 130 may be formed directly on at least one layer constituting the display panel 110, e.g., an upper substrate, a thin film encapsulation layer, or an insulating layer of the display panel 110.

In FIG. 1, it is illustrated that the touch array 130 is disposed above the display panel 110. However, the touch array 130 is not limited thereto. For example, the touch array 130 may be disposed under the display panel 110.

The display panel 110 may include a display area DA for displaying an image and a non-display area NDA at the periphery of the display area DA. The non-display area NDA may at least partially surround the display area DA. The display panel 110 may include pixels PX formed on a substrate. The pixels PX may be disposed in the display area DA. In embodiments, the substrate may be a rigid substrate including a material such as glass or tempered glass. In other embodiments, the substrate may be a flexible substrate including a material such as plastic or metal.

The pixels PX may be connected to driving lines SL and data lines DL. The pixels PX may be selected by a driving signal having a turn-on level, which is supplied through the driving lines SL, and receive data signals through the data lines DL. Accordingly, the pixels PX emit light with luminances corresponding to the data signals, and an image is displayed in the display area DA.

Lines and/or a built-in circuit, connected to the pixels PX may be disposed in the non-display area NDA. For example, a scan driver may be further disposed in the non-display area NDA.

In some embodiments, the display panel 110 may include, as the pixels PX, organic light emitting diodes, inorganic light emitting diodes, quantum dot/well light emitting diodes, and the like. In other embodiments, the display panel 110 may be implemented as a liquid crystal display panel. The display device 1 may additionally include a light source such as a back-light unit.

The touch array 130 may include an active area SA capable of sensing a touch and a non-active area NSA at the periphery of the active area SA. The active area SA may at least partially overlap the display area DA.

The touch array 130 may include a substrate and touch electrodes formed on the substrate. In embodiments, the touch electrodes may include driving electrodes TX and sensing electrodes RX. The driving electrodes TX and the sensing electrodes RX may be disposed in the active area SA on the substrate. In some embodiments, the substrate may be a rigid substrate including a material such as glass or tempered glass. In other embodiments, the substrate may be a flexible substrate including a material such as plastic or metal. In embodiments, at least one layer constituting the display panel 110 may be used as the substrate of the touch array 130.

In embodiments, a display driver 150 and a touch driver 140 of the display device 1 may be configured as separate integrated chips (ICs). In other embodiments, the display driver 150 and the touch driver 140 may be mounted in one IC.

The display driver 150 is electrically connected to the display panel 110 to drive the pixels PX. For example, the display driver 150 may include a data driver connected to the data lines DL, a scan driver connected to the drive lines SL, and a timing controller for controlling the data driver and the scan driver. As another example, the display driver 150 may include a data driver and a timing controller, and the scan driver may be disposed in the non-display area NDA of the display panel 110.

The touch driver 140 may be connected to the touch panel 130 and drive the touch panel 130 using a driving signal.

The display driver 150 may display an image on the display panel 110 in units of display frames. The touch driver 140 may sense a touch in units of sensing frames. The sensing frame period and the display frame period may be synchronized or asynchronous.

Figure 2:
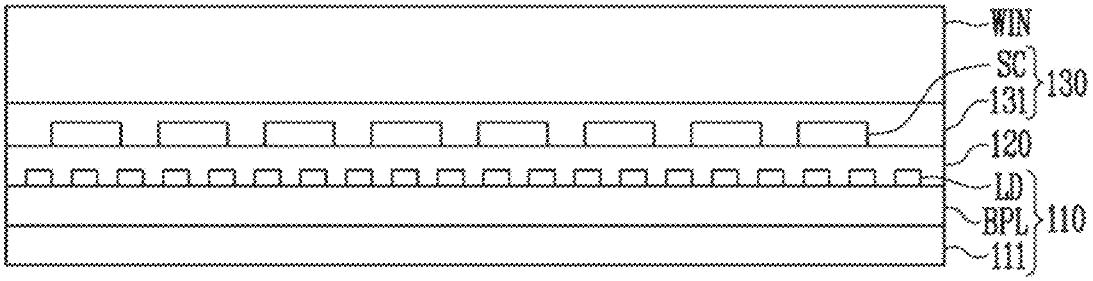
FIG. 2 is a sectional view illustrating an embodiment of the display device shown in FIG. 1.

FIG. 2 is a sectional view illustrating an embodiment of the display device shown in FIG. 1.

Referring to FIG. 2, a sensor unit 130 is stacked on the top of a display unit 110, and a window WIN may be stacked on the top of the sensor unit 130.

The display unit 110 may include a display substrate 111, a circuit element layer BPL formed on the display substrate 111, and light emitting elements LD formed on the circuit element layer BPL. The circuit element layer BPL may include pixel circuits (e.g., a transistor and a capacitor) for driving light emitting elements LD of pixels PX, scan lines, data lines, and the like.

An encapsulation layer 120 covering the light emitting elements LD may be further provided. In embodiments, the encapsulation layer 120 may include at least one inorganic layer and at least one organic layer. According to such a configuration, the encapsulation layer 120 can protect the light emitting elements LD from an external environment.

The sensor unit 130 may include sensors SC formed on the display unit 110 and a protective layer 131 covering the sensors SC. The sensors SC may be provided as the driving electrodes TX and the sensing electrodes RX, which are shown in FIG. 1. The encapsulation layer 120 may serve as a sensor substrate supporting the sensor unit 130. In another embodiment, a separate sensor substrate supporting the sensor unit 130 may be provided separately from the encapsulation layer 120.

The window WIN is a protective member disposed at an uppermost end of the display device 1, and may be a substantially transparent transmissive substrate. The window WIN may have a multi-layer structure selected from a glass substrate, a plastic film, and a plastic substrate. The window WIN may include a rigid or flexible base, and the material constituting the window WIN is not particularly limited.

The display device 1 may further include a polarizing plate (or another kind of anti-reflection layer) for preventing external light reflection between the window WIN and the sensor unit 130.

Figure 3:
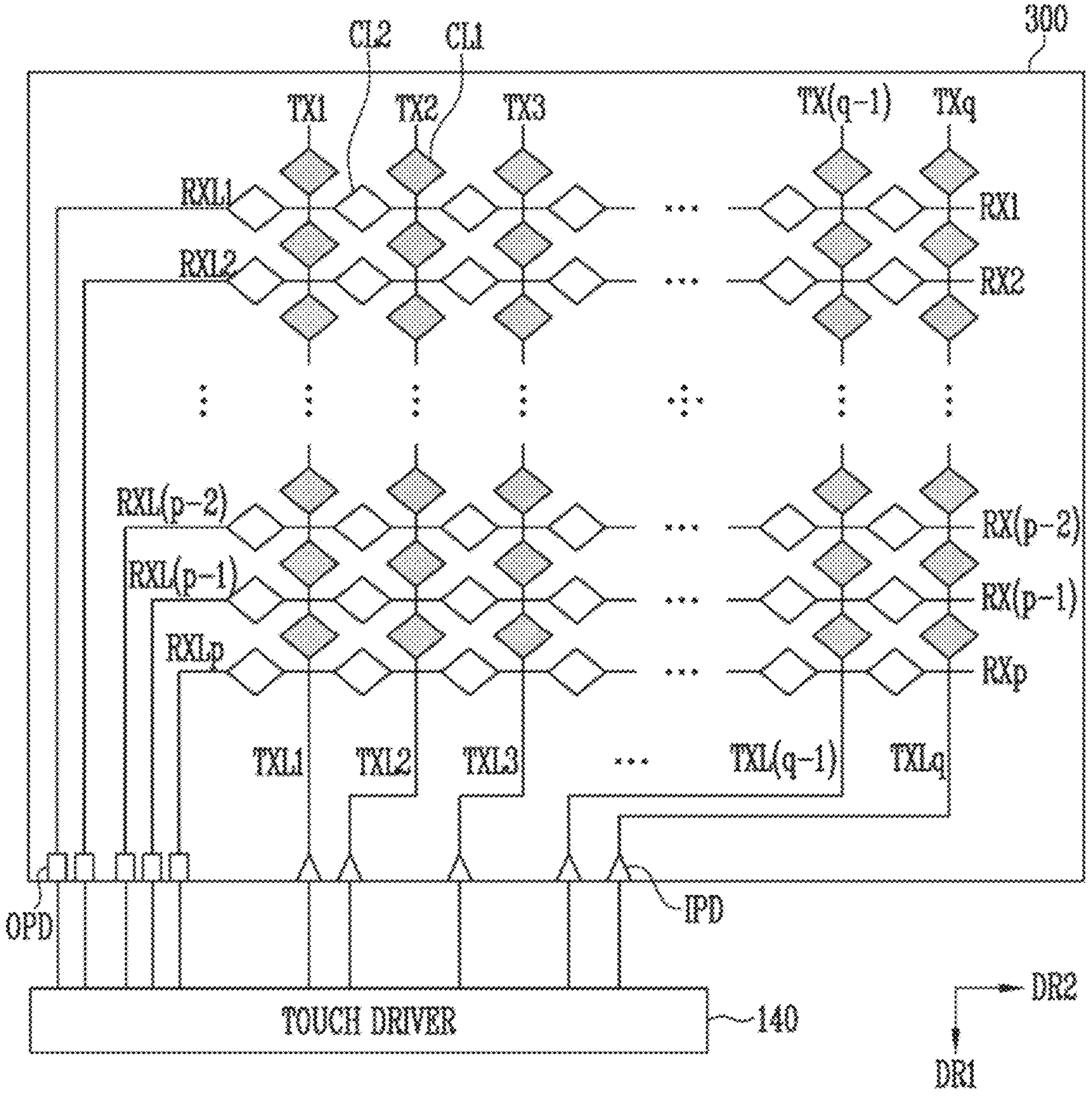
FIG. 3 is a block diagram illustrating an embodiment of a touch array and a touch driver, which are shown in FIG. 1.

FIG. 3 is a block diagram illustrating an embodiment of a touch array and a touch driver, which are shown in FIG. 1.

Referring to FIG. 3, a touch array 300 may include first to qth driving electrodes TX1 to TXq and first to pth sensing electrodes RX1 to RXp (each of p and q is a positive integer). The first to qth driving electrodes TX1 to TXq may be respectively connected to first to qth driving lines TXL1 to TXLq. The first to pth sensing electrodes RX1 to RXp may be respectively connected to first to pth sensing lines RXL1 to RXLp. The touch array 300 may be provided as the touch array 130 shown in FIG. 1. The first to qth driving electrodes TX1 to TXq may be provided as the driving electrodes TX shown in FIG. 1, and the first to pth sensing electrodes RX1 to RXp may be provided as the sensing electrodes RX shown in FIG. 1.

Each of the first to qth driving electrodes TX1 to TXq may include first cells CL1 which are arranged in a first direction DR1 and are electrically connected to each other, and each of the first to pth sensing electrodes RX1 to RXp may include second cells CL2 which are arranged in a second direction DR2 and are electrically connected to each other. In FIG. 3, it is illustrated that each of the first cells CL1 and the second cells CL2 has a diamond shape. However, embodiments are not limited thereto. For example, each of the first cells CL1 and the second cells CL2 may have at least one of various shapes such as a circular shape, a quadrangular shape, and a mesh shape. Additionally, each of the first cells CL1 and the second cells CL2 may be formed as a single layer or a multi-layer. As such, the shapes and arrangements of the first to qth driving electrodes TX1 to TXq and the first to pth sensing electrodes RX1 to RXp may be variously modified.

In embodiments, the first cells CL1 and the second cells CL2 may include at least one of various conductive materials such as a metal material and a transparent conductive material, thereby having conductivity. For example, the first cells CL1 and the second cells CL2 may include at least one of various metal materials such as gold (Au), silver (Ag), aluminum (Al), molybdenum (Mo), chromium (Cr), titanium (Ti), nickel (Ni), neodymium (Nd), copper (Cu), and platinum (Pt), or alloys thereof.

The touch array 300 may further include input pads IPD connected to the first to qth driving lines TXL1 to TXLq. A touch driver 140 may be connected to the first to qth driving lines TXL1 to TXLq through the input pads IPD.

The touch array 300 may further include output pads OPD connected to the first to pth sensing lines RXL1 to RXLp. The touch driver 140 may be connected to the first to pth sensing lines RXL1 to RXLp through the output pads OPD.

The touch array 300 may include first touch electrodes and second touch electrodes forming mutual capacitances together with the first touch electrodes. The first touch electrodes may be provided as the first to qth driving electrodes TX1, TX2, TX3, . . . , TX(q−1), and TXq. The second touch electrodes may be provided as the first to pth sensing electrodes RX1, RX2, . . . , RX(p−2), RX(p−1), and RXp. The first to qth driving electrodes TX1 to TXq may extend in the first direction DR1, and be arranged to be spaced apart from each other in the second direction DR2. The first to pth sensing electrodes RX1 to RXp may extend in the second direction DR2, and be arranged to be spaced apart from each other in the first direction DR1. The first to pth sensing electrodes RX1 to RXp may be electrically separated from the first to qth driving electrodes TX1 to TXq while intersecting the first to qth driving electrodes TX1 to TXq, to form mutual capacitances with the first to qth driving electrodes TX1 to TXq.

When a touch is provided to the touch array 300, one or more of the mutual capacitances may be changed. For example, the touch may include at least one of various types of inputs, such as a physical contact and hovering, which cause a change in mutual capacitance. The touch driver 140 may sense the change in mutual capacitance, thereby recognizing the touch.

The touch driver 140 may be connected to the first to qth driving electrodes TX1 to TXq through the first to qth driving lines TXL1 to TXLq.

The touch driver 140 may be connected to the first to pth sensing electrodes RX1 to RXp through the first to pth sensing lines RXL1 to RXLp.

The touch driver 140 may sense sensing signals from the first to pth sensing electrodes RX1 to RXp through the first to pth sensing lines RXL1 to RXLp while applying driving signals to the first to qth driving electrodes TX1 to TXq through the first to qth driving lines TXL1 to TXLq. The touch driver 140 may sense a change in mutual capacitance, based on the sensing signals.

The display device 1 shown in FIG. 1 may communicate signals with an external device through the first to qth driving electrodes TX1 to TXq and the first to pth sensing electrodes RX1 to RXp. For example, the touch driver 140 may supply uplink signals through the first to qth driving electrodes TX1 to TXq and the first to pth sensing electrodes RX1 to RXp, and the external device may receive (or acquire) at least some of the uplink signals when the external device is adjacent to the touch array 300. In an embodiment, an uplink signal may refer to the transmission of data from a smaller or subsidiary network communication device or station to a larger or primary one. This is typically from a client device, such as a mobile phone or computer, to a server or main network, like a satellite or base station.

Figure 4:
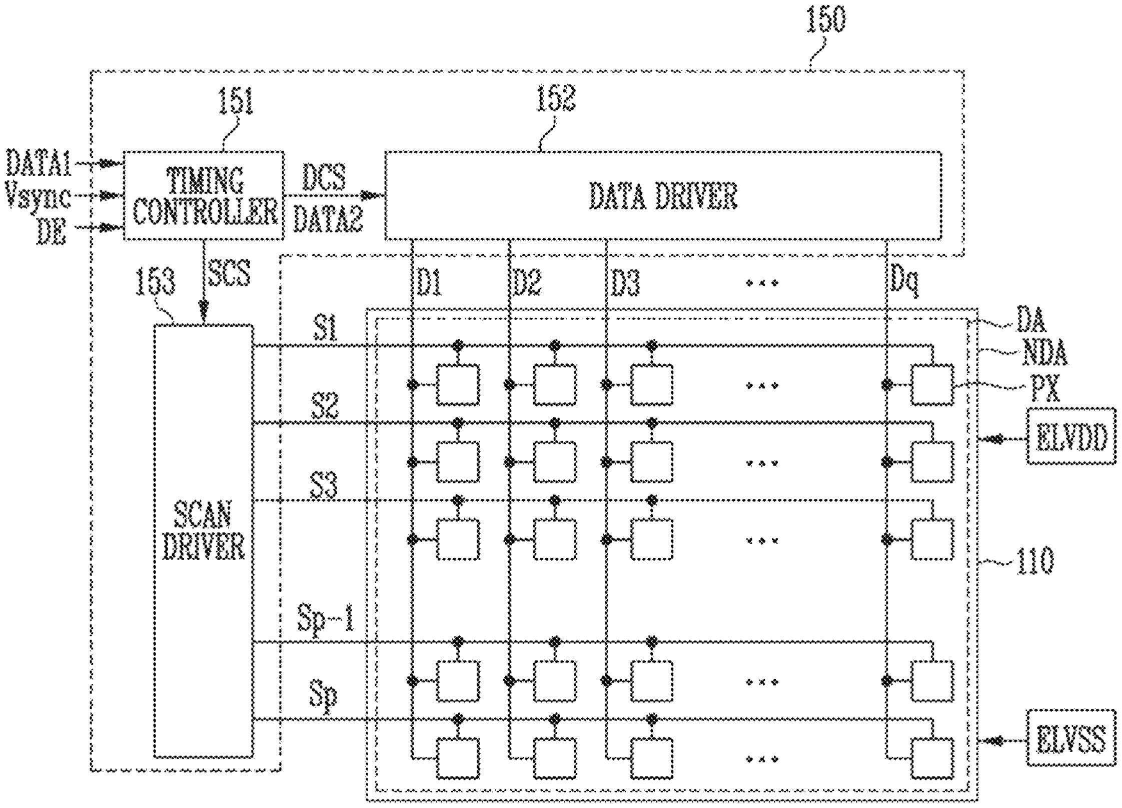
FIG. 4 is a block diagram illustrating an embodiment of a display panel and a display driver, which are shown in FIG. 1.

FIG. 4 is a block diagram illustrating an embodiment of a display panel and a display driver, which are shown in FIG. 1.

Referring to FIG. 4, the display device 1 may include a display panel 110 and a display driver 150.

The display panel 110 may include pixels PX, and data lines D1 to Dq and scan lines S1 to Sp, which are connected to the pixels PX.

The display panel 110 may include a display area DA for displaying an image and a non-display area NDA at the periphery of the display area DA. The non-display area NDA may at least partially surround the display area DA.

Each of the pixels PX may be connected to a first power source ELVDD and a second power source ELVSS.

The pixels PX may include light emitting elements (e.g., LD shown in FIG. 2). Each pixel PX may control a current flowing from the first power source ELVDD to the second power source ELVSS via a light emitting element according to a data signal supplied through a corresponding data line, and the light emitting element may generate light according to the controlled current. The first power source ELVDD may be a high-potential voltage, and the second power source ELVSS may be a low-potential voltage.

The display driver 150 may include a timing controller 151, a data driver 152, and a scan driver 153.

The timing controller 151 may generate control signals for controlling the scan driver 153 and the data driver 152 in response to control signals from the outside. For example, the control signals from the outside may include a data enable signal DE and a vertical synchronization signal Vsync. For example, the timing controller 151 may control the scan driver 153 by outputting a scan driver control signal SCS to the scan driver 153 in response to the control signals from the outside. The timing controller 151 may control the data driver 152 by outputting a data driver control signal DCS to the data driver 152 in response to the control signals from the outside.

The timing controller 151 may convert first image data DATA1 input from the outside into second image data DATA2 suitable for specifications of the data driver 152, and thereafter supply the second image data DATA2 to the data driver 152.

The first image data DATA1 may include luminance information of each of the pixels PX of the display panel 110. The first image data DATA1 may be divided in units of frames.

The data enable signal DE may be a signal for defining a period in which valid data is input.

The data driver 152 may generate data signals according to the data driver control signal DCS and the second image data DATA2, which are input from the timing controller 151. The data driver 152 may supply the generated data signals to the data lines D1 to Dq.

In order for the data driver 152 to be connected to the data lines D1 to Dq, the data driver 152 may be mounted directly on a substrate on which the pixels PX are formed, or be connected to the substrate on which the pixels PX are formed through a separate component such as a flexible circuit board.

When a scan signal is supplied to each scan line, pixels PX connected to the corresponding scan line may be supplied with data signals transferred from the data line D1 to Dq. The corresponding pixels PX may emit light with a luminance corresponding to the supplied data signals.

The scan driver 153 may supply scan signals to the scan lines S1 to Sp in response to the scan driver control signal SCS. For example, the scan driver 153 may sequentially supply the scan signals to the scan lines S1 to Sp.

In order for the scan driver 153 to be connected to the scan lines S1 to Sp, the scan driver 153 may be mounted directly on the substrate on which the pixels PX are formed, or be connected to the substrate on which the pixels PX are formed through a separate component such as a flexible circuit board.

In FIG. 4, it is illustrated that the timing controller 151, the data driver 152, and the scan driver 153 are components separate from one another. However, at least some of the these components may be integrated in some embodiments.

Figure 5:
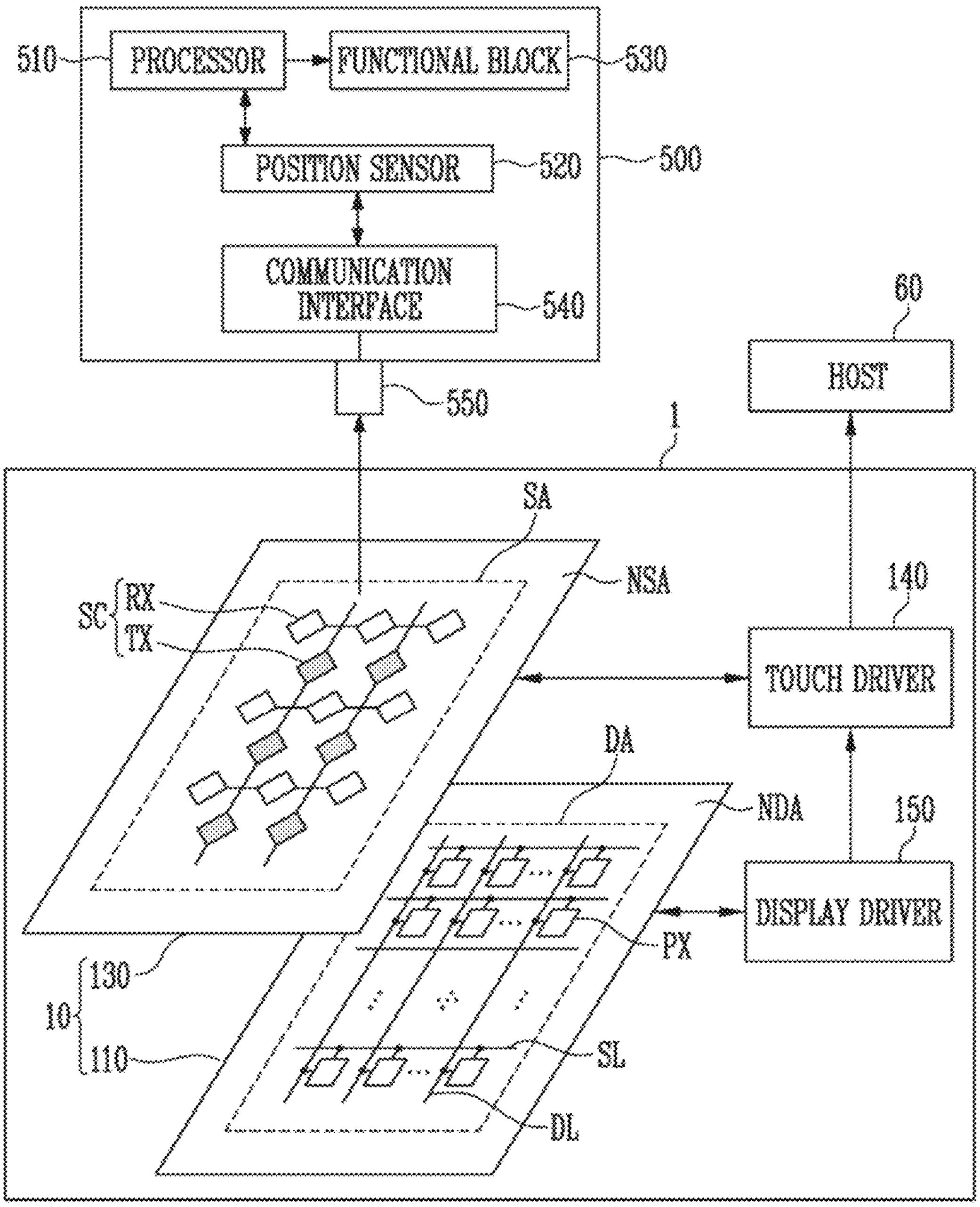
FIG. 5 is a block diagram illustrating an embodiment of a display system including a display device.

FIG. 5 is a block diagram illustrating an embodiment of a display system including a display device.

Referring to FIG. 5, the display system includes a display device 1, a host 60, and an external device 500.

The display device 1 may include a panel 10, a touch driver 140, and a display driver 150. The panel 10 may include a display panel 110 and a touch array 130. The touch array 130 may include sensing electrodes RX and driving electrodes TX.

The external device 500 may include a processor 510, a position sensor 520, a functional block 530, a communication interface 540, and a receiving electrode 550. In embodiments, the external device 500 may include an active pen.

The functional block 530 may include a display module configured to display an image, a motor or propeller for physically moving the external device 500, and the like.

In embodiments, the display driver 150 may periodically transmit, to the touch driver 140, a vertical synchronization signal Vsync and/or information on the vertical synchronization signal Vsync.

Referring to FIG. 5 together with FIG. 3, the first to pth sensing electrodes RX1 to RXp and the first to qth driving electrodes TX1 to TXq intersect each other. Each sensing electrode and each driving electrode may be electrically separated from each other, and accordingly, a mutual capacitance may be defined or formed between each sensing electrode and each driving electrode. As such, mutual capacitances may be formed where the first to pth sensing electrodes RX1 to RXp and the first to qth driving electrodes TX1 to TXq intersect each other.

When a touch is provided to the touch array 130, one or more of the mutual capacitances may be changed.

The touch may include at least one of various types of inputs, such as a physical contact and hovering, which cause a change in mutual capacitance. The touch driver 140 may sense the change in mutual capacitance, thereby recognizing the touch.

The touch driver 140 may encode data representing each touch electrode (or a position of each touch electrode), and output an encoded data signal as an uplink signal to the external device 500 through the corresponding touch electrode. For example, the touch driver 140 may encode data corresponding to each of the first to qth driving electrodes TX1 to TXq, and output an encoded data signal as an uplink signal through the corresponding driving electrode. In other words, the touch driver 140 can encode data corresponding to the first driving electrode TX1 and then send an encoded data signal as an uplink signal to the external device 500 via the first touch electrode TX1. Additionally, the touch driver 140 may encode data corresponding to each of the first to pth sensing electrodes RX1 to RXp, and output an encoded data signal as an uplink signal through the corresponding sensing electrode. In other words, the touch driver 140 can encode data corresponding to the first sensing electrode RX1 and then send an encoded data signal as an uplink signal to the external device 500 via the first sensing electrode RX1. Accordingly, uplink signals representing different positions can be output through the touch electrodes.

In embodiments, the encoded data signal and the uplink signal may further include information on the vertical synchronization signal Vsync, information on the panel 10, protocol version information, and the like. The external device 500 may acquire the information on the vertical synchronization signal Vsync from the uplink signal, and determine a transmission time of a downlink signal according to the acquired information. Additionally, the external device 500 may check the information on the panel 10 or a version of a protocol from the uplink signal.

The receiving electrode 550 of the external device 500 may be connected to the communication interface 540. When the receiving electrode 550 is adjacent to the touch array 130, a relatively low capacitor (or capacitance) may be formed between at least some of the sensing electrodes RX and the driving electrodes TX and the receiving electrode 550. The external device 500 may communicate an uplink signal and/or a downlink signal with the corresponding sensing electrode and/or the corresponding driving electrode through the relatively low capacitor (or capacitance).

The communication interface 540 may amplify a received signal. For example, the communication interface 540 may amplify a signal received through the receiving electrode 550 in an uplink process. For example, the communication interface 540 may amplify a signal received from the position sensor 520 in a downlink process.

The communication interface 540 may be configured to convert an analog signal into a digital signal, and convert a digital signal into an analog signal. For example, the communication interface 540 may convert an analog signal (e.g., an uplink signal) received through the receiving electrode 550 into a digital signal, and provide the converted digital signal to the position sensor 520. For example, the communication interface 540 may convert a digital signal received from the position sensor 520 into an analog signal (e.g., a downlink signal), and output the converted analog signal through the receiving electrode 550.

The processor 510 may be configured to control overall operations of the external device 500. For example, the processor 510 may control the position sensor 520. For example, the processor 510 may control an operation of the position sensor 520 by transmitting a position sensor control signal to the position sensor 520.

The position sensor 520 may calculate position information by decoding a signal received from the communication interface 540.

The processor 510 may receive position information from the position sensor 520. In embodiments, the processor 510 may transmit the received position information to the functional block 530. The functional block 530 may perform several functions by using the received position information. For example, the functional block 530 may include a display module. The functional block 530 may visualize the receive position information. In another example, the functional block 530 may be a motor for moving the external device 500 in a specific direction. The functional block 530 may allow the external device 500 to be moved by driving the motor according to the received position information.

In embodiments, the processor 510 may control the position sensor 520 and the communication interface 540 to transmit position information in the form of a downlink signal to the display device 1. The position sensor 520 may encode the position information and provide an encoded data signal that includes the position information to the communication interface 540. The communication interface 540 may transmit the encoded data signal as a downlink signal to the touch array 130 through the receiving electrode 550. The display device 1 may receive the downlink signal through a touch electrode adjacent to the receiving electrode 550 among the sensing electrodes RX and the driving electrodes TX of the touch array 130.

In embodiments, the downlink signal may further include state information of the external device 500. For example, when the external device 500 is an active pen, the state information may further include information on a button state of the active pen, a battery state of the active pen, a slope of the active pen when the active pen is in contact with the touch array 130, and the like.

The touch driver 140 may receive a downlink signal through the touch array 130. The touch driver 140 may extract position information of the external device 500 by decoding the downlink signal. In embodiments, the downlink signal may further include state information associated with the external device 500. The touch driver 140 may further extract state information of the external device 500 by decoding the downlink signal. The touch driver 140 may transfer the extracted position information and the extracted state information to the host 60. In some embodiments, the display device 1 and the host 60 may perform wired communication with each other. In other embodiments, the display device 1 and the host 60 may perform wireless communication with each other.

Figure 6:
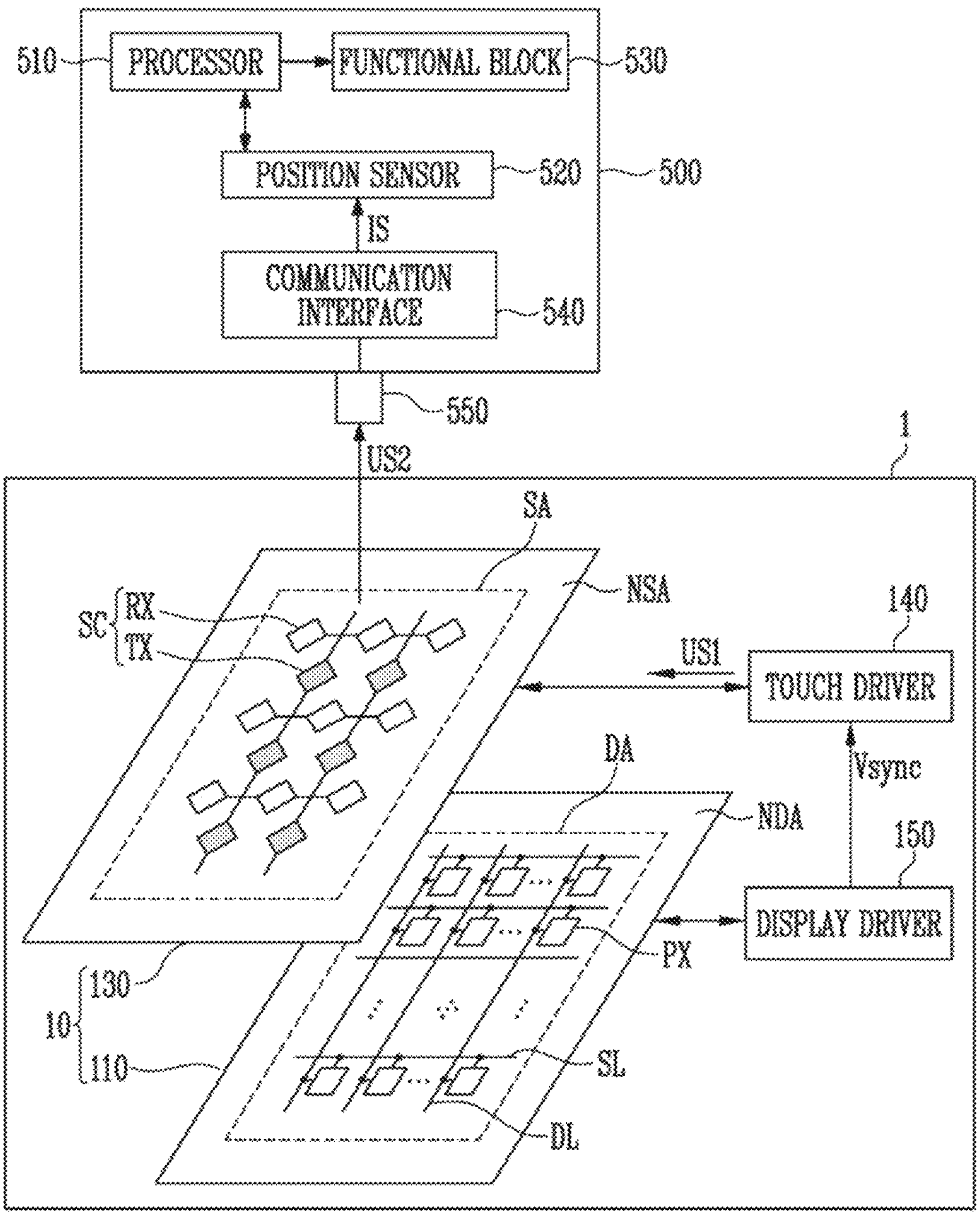
FIG. 6 is a block diagram illustrating processes in which an uplink signal is communicated in the display system shown in FIG. 5.

FIG. 6 is a block diagram illustrating processes in which an uplink signal is communicated in the display system shown in FIG. 5.

Referring to FIG. 6, the touch driver 140 may encode data representing a position of each of the sensing electrodes RX and the driving electrodes TX, and output an encoded data signal US1 as an uplink signal US2 to the external device 500 through the corresponding touch electrode. For example, the touch driver 140 may encode data corresponding to each of the first to qth driving electrodes TX1 to TXq shown in FIG. 3, and output an encoded data signal US1 as an uplink signal US2 through the corresponding driving electrode. In other words, the uplink signal US2 that includes the encoded data of the qth driving electrode TXq may be output from the qth driving electrode TXq to the receiving electrode 550 of the external device 500. Additionally, the touch driver 140 may encode data corresponding to each of the first to pth sensing electrodes RX1 to RXp shown in FIG. 3, and output an encoded data signal US1 as an uplink signal US2 through the corresponding sensing electrode. In other words, the uplink signal US2 that includes the encoded data of the pth sensing electrode RXp may be output from the pth sensing electrode RXp to the receiving electrode 550 of the external device 500. Accordingly, uplink signals US2 representing different positions may be output through the touch electrodes.

In embodiments, the touch driver 140 may output an uplink signal US2 when the external device 500 is adjacent to the touch array 130. For example, the touch driver 140 may output an uplink signal US2 when the external device 500 senses that a mutual capacitance between sensing and driving electrodes RX and TX is changed while the external device 500 is adjacent to the touch array 130.

In embodiments, the display driver 120 may periodically transmit, to the touch driver 140, a vertical synchronization signal Vsync and/or information on the vertical synchronization signal Vsync. The touch driver 140 may output an uplink signal through the sensing and driving electrodes RX and TX with reference to the vertical synchronization signal Vsync.

When the external device 500 approaches the touch array 130, the external device 500 may receive an uplink signal US2 from at least some of the sensing electrodes RX and the driving electrodes TX. When the external device 500 approaches the touch array 130, an electric field may be generated between the receiving electrode 550 and the touch array 130. As the electric field is formed, a virtual capacitance may be formed between at least some of the sensing electrodes RX and the driving electrodes TX and the receiving electrode 550. The impedance of the virtual capacitance may become smaller as the external device 500 gets closer to the corresponding touch electrode. As the impedance of the virtual capacitance become smaller, the uplink signal US2 may be more smoothly transmitted to the receiving electrode 550 from the corresponding touch electrode. For example, the external device 500 may receive an uplink signal US2 from an adjacent driving electrode among the first to qth driving electrodes TX1 to TXq, and receive an uplink signal US2 from an adjacent sensing electrode among the first to pth sensing electrodes RX1 to RXp. The external device 500 may acquire position data of the corresponding driving electrode and position data of the corresponding sensing electrode by decoding the received uplink signals US2. As such, the external device 500 decodes the received uplink signals US2, thereby calculating position information of the external device 500 on the touch array 130. In other words, the external device 500 may calculate its own position information.

The communication interface 540 may receive uplink signals US2 through the receiving electrode 550. The communication interface 540 may transmit the uplink signals US2 in the form of an input signal IS to the position sensor 520.

The position sensor 520 may acquire touch position information of the external device 500 on the touch array 130 by decoding the input signal IS. In other words, the position sensor 520 can obtain touch position information of the external device 500 on the touch array 130 by decoding the input signal IS.

In embodiments, the external device 500 may include a communication device which supports wireless communication such as Bluetooth communication, and the processor 510 may transfer the touch position information to the host 60 through wireless communication using the communication device.

In embodiments, the host 60 along with the display device 1 may be included in a computing device such as a computer, a notebook computer, a mobile phone, a smartphone, or a wearable device. The host 60 may perform various operations by using the touch position information.

In addition, the external device 500 may perform various operations by using the touch position information. For example, the external device 500 may include the functional block 530 for performing various operations, and the functional block 530 may receive the touch position information from the processor 510. The functional block 530 may perform various operations by using the touch position information.

Figure 7:
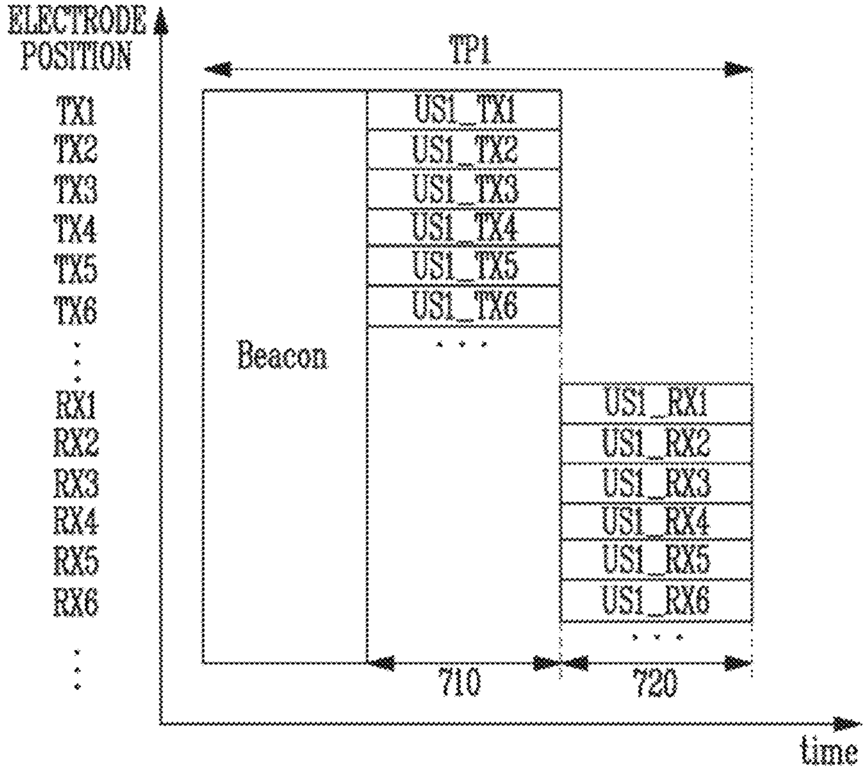
FIGS. 7, 8 and 9 are timing diagrams illustrating embodiments of uplink signals in a first time period.
Figure 8:
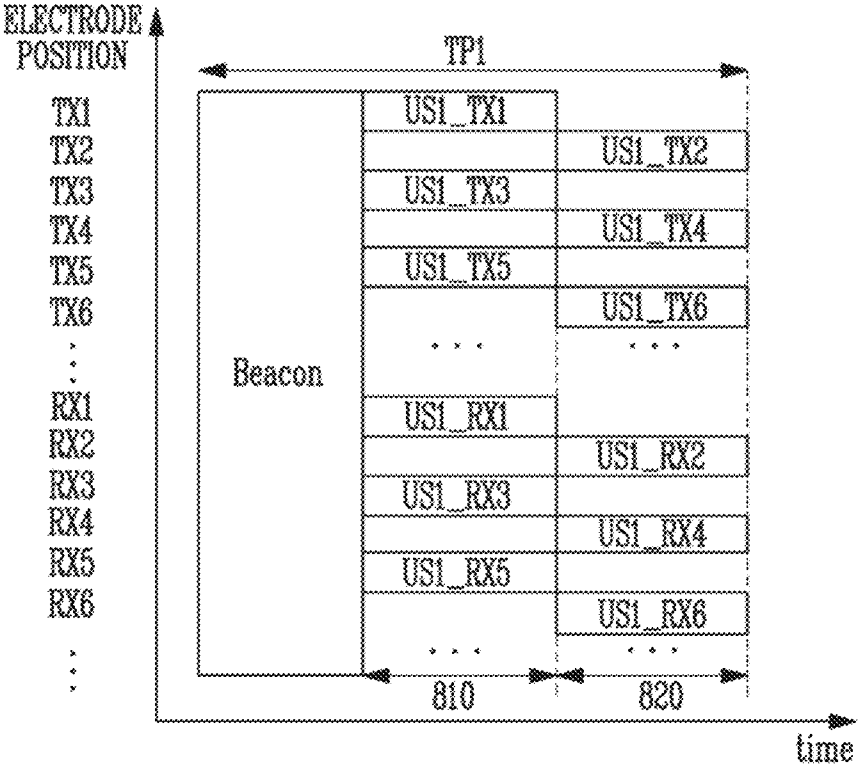
Figure 9:
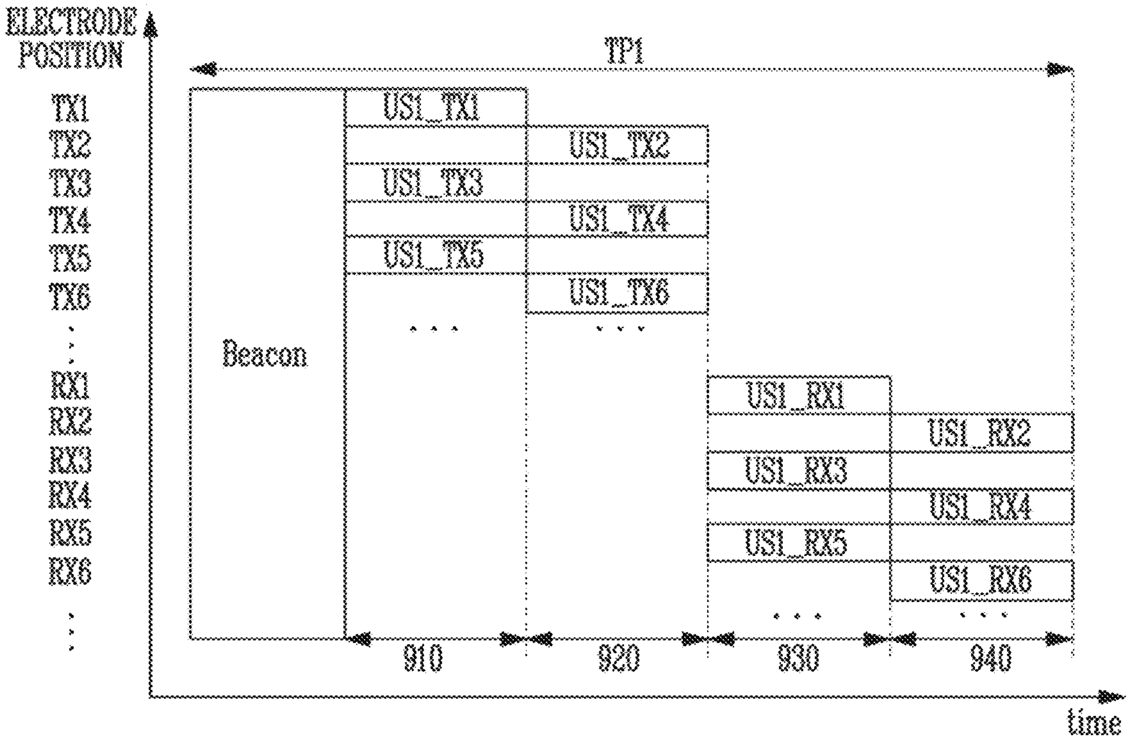

FIGS. 7 to 9 are timing diagrams illustrating embodiments of uplink signals in a first time period.

In FIGS. 7 to 9, the display device 1 and the external device 500 may communicate with each other in units of frames or units of packets, and a first frame may include a first time period TP1 in which an uplink signal is transmitted and a second time period TP2 in which a downlink signal is transmitted. It is to be understood that a second frame after the first frame may also include a first time period TP1. Additionally, the second frame may further include a second time period TP2 after the first time period TP1. As such, the communication between the display device 1 and the external device 500 may include a plurality of frames, and each frame may further include a first time period TP1 and a second time period TP2. However, for convenience of description, a first time period TP1 in which an uplink signal is transmitted among a plurality of time periods of a frame is illustrated. A second time period TP2 will be described in detail with reference to FIG. 13.

For example, in the first time period TP1, the display device 1 may transmit a beacon signal as an uplink signal to the external device 500. The display device 1 may select a protocol and control a timing according to the beacon signal. In addition, after the external device 500 normally receives the beacon signal, the external device 500 may calculate information from the beacon signal. For example, the beacon signal is a signal periodically transmitted from the touch array 130, and may include at least one of panel information (e.g., panel state information, panel identification information, and the like), characteristic information (e.g., a frequency, a voltage level, and the like) of a downlink signal, and the like. The beacon signal may further include information for driving synchronization between the touch array 130 and the external device 500. In other words, the beacon signal might also contain information to synchronize the touch array 130 with the external device 500.

Referring to FIGS. 3 and 7, the first time period TP1 may include a first sub-time period 710 in which uplink signals including position information of the driving electrodes TX1 to TXq are transmitted and a second sub-time period 720 in which uplink signals including position information of the sensing electrodes RX1 to RXp are transmitted, after a period in which the beacon signal is transmitted.

For example, in the first sub-time period 710, the display device 1 may transmit, to the external device 500, uplink signals US1_TX1 to US1_TXq, which respectively correspond to the driving electrodes TX1 to TXq. In the second sub-time period 720 after the first sub-time period 710, the display device 1 may transmit, to the external device 500, uplink signals US1_RX1 to US1_RXp, which respectively correspond to the sensing electrodes RX1 to RXp. Each uplink signal may have an electrical pulse form including a digital component representing position information of the touch electrodes. In other words, each uplink signal may include multiple pulses having different forms.

Referring to FIGS. 3 and 8, the first time period TP1 may include a first sub-time period 810 in which uplink signals including position information of selected driving electrodes TX1, TX3, TX5, . . . , and TX(2N−1) among the driving electrodes TX1 to TXq and selected sensing electrodes RX1, RX3, RX5, . . . , and RX(2N−1) among the sensing electrodes RX1 to RXp are transmitted and a second sub-time period 820 in which uplink signals including position information of selected driving electrodes TX2, TX4, TX6, . . . , TX(2N) among the driving electrodes TX1 to TXq and selected sensing electrodes RX2, RX4, RX6, . . . , RX(2N) among the sensing electrodes RX1 to RXp are transmitted, after the period in which the beacon signal is transmitted.

For example, in the first sub-time period 810, the display device 1 may transmit, to the external device 500, uplink signals US1_TX1, US1_TX3, US1_TX5, . . . , and US1_TX(2N−1) and US1_RX1, US1_RX3, US1_RX5, . . . , US1_RX(2N−1) respectively corresponding to the selected driving electrodes TX1, TX3, TX5, . . . , and TX(2N−1) among the driving electrodes TX1 to TXq and the selected sensing electrodes RX1, RX3, RX5, . . . , and RX(2N−1) among the sensing electrodes RX1 to RXp. In the second sub-time period 820 after the first sub-time period 810, the display device 1 may transmit, to the external device 500, uplink signals US1_TX2, US1_TX4, US1_TX6, . . . , and US1_TX(2N) and US1_RX2, US1_RX4, US1_RX6, . . . , US1_RX(2N) respectively corresponding to the selected driving electrodes TX2, TX4, TX6, . . . , and TX(2N) among the driving electrodes TX1 to TXq and the selected sensing electrodes RX2, RX4, RX6, . . . , and RX(2N) among the sensing electrodes RX1 to RXp.

Referring to FIGS. 3 and 9, the first time period TP1 may include a first sub-time period 910 in which uplink signals including position information of selected driving electrodes TX1, TX3, TX5, . . . , and TX(2N−1) among the driving electrodes TX1 to TXq are transmitted, a second sub-time period 920 in which uplink signals including position information of the other driving electrodes TX2, TX4, TX6, . . . , and TX(2N) among the driving electrodes TX1 to TXq are transmitted, a third sub-time period 930 in which uplink signals including position information of selected sensing electrodes RX1, RX3, RX5, . . . , and RX(2N−1) among the sensing electrodes RX1 to RXp are transmitted, and a fourth sub-time period 940 in which uplink signals including position information of the other sensing electrodes RX2, RX4, RX6, . . . , and RX(2N) among the sensing electrodes RX1 to RXp are transmitted, after the period in which the beacon signal is transmitted.

For example, in the first sub-time period 910, the display device 1 may transmit, to the external device 500, uplink signals US1_TX1, US1_TX3, US1_TX5, . . . , and US1_TX(2N−1), which respectively correspond to the selected driving electrodes TX1, TX3, TX5, . . . , and TX(2N−1). In the second sub-time period 920 after the first sub-time period 910, the display device 1 may transmit, to the external device 500, uplink signals US1_TX2, US1_TX4, US1_TX6, . . . , and US1_TX(2N), which respectively correspond to the other driving electrodes TX2, TX4, TX6, . . . , and TX(2N). In the third sub-time period 930 after the second sub-time period 920, the display device 1 may transmit, to the external device 500, uplink signals US1_RX1, US1_RX3, US1_RX5, . . . , and US1_RX(2N−1), which respectively correspond to the selected sensing electrodes RX1, RX3, RX5, . . . , and RX(2N−1). In the fourth sub-time period 940 after the third sub-time period 930, the display device 1 may transmit, to the external device 500, uplink signals US1_RX2, US1_RX4, US1_RX6, . . . , and US1_RX(2N), which respectively correspond to the other sensing electrodes RX2, RX4, RX6, . . . , and RX(2N).

As such, the first time period TP1 may be divided into N sub-time periods after the period in which the beacon signal is transmitted. In addition, the driving electrodes and the sensing electrodes may be variously grouped, and uplink signals may be transmitted through touch electrodes of one group in each sub-time period.

Figure 10:
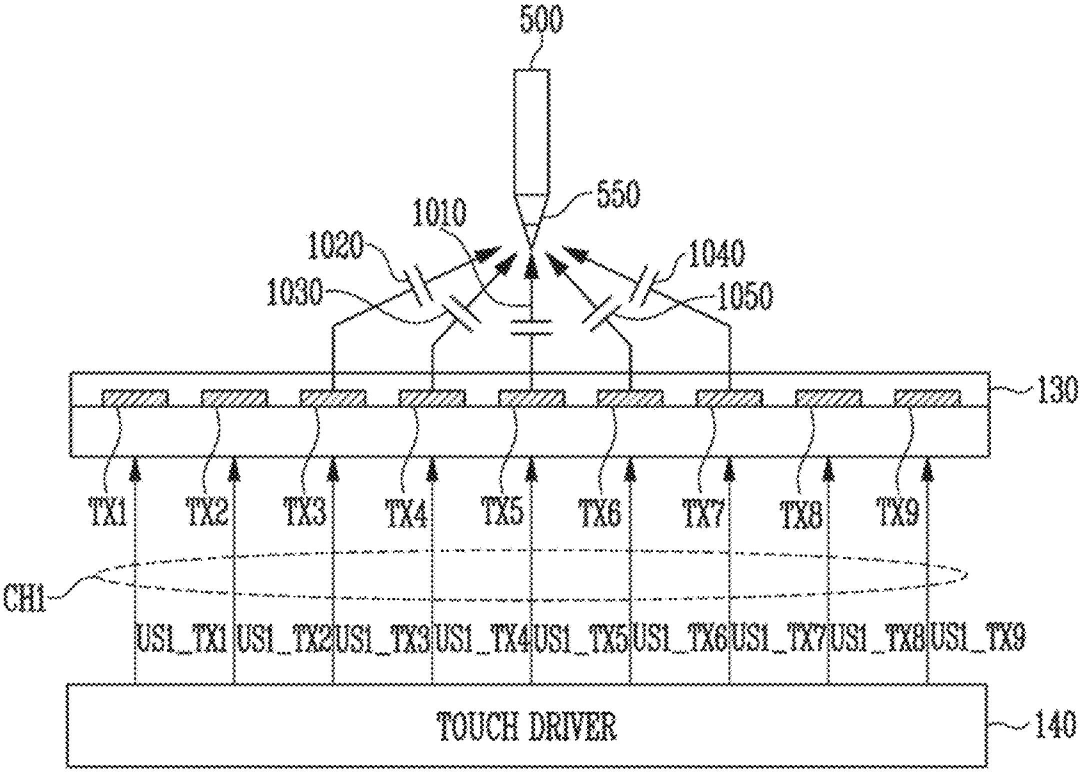
FIG. 10 is a diagram illustrating an external device, a touch array, and capacitors formed between the external device and the touch array.

FIG. 10 is a diagram illustrating an external device, a touch array, and capacitors formed between the external device and the touch array.

The external device 500 may include an active pen.

Referring to FIG. 10, an operation in which the active pen receives uplink signals through capacitors generated between the active pen and adjacent touch electrodes is described.

As shown in FIG. 10, the touch driver 140 may apply uplink signals US1_TX1 to US1_TX9 in which different position information are included to driving electrodes TX1 to TX9 of the touch array 130 through a first channel CH1. For example, the uplink signal US1_TX1 may include position information of the driving electrode TX1 and the uplink signal US1_TX2 may include position information of the driving electrode TX2. The position information of the driving electrode TX1 is different from that of the driving electrode TX2. In addition, the active pen 200 may transmit uplink signals through capacitors generated between the active pen and adjacent touch electrodes TX3 to TX7. Additionally, the active pen may acquire capacitance information of capacitors 1010, 1020, 1030, 1040 and 1050 generated in the corresponding touch electrodes from the transmitted uplink signals. For example, capacitance information of a capacitor 1010 generated between a driving electrode TX5 of a fifth column, to which the active pen is most adjacent, and the active pen may be included in an uplink signal transmitted from the driving electrode TX5 of the fifth column. Digital components for the uplink signals US1_TX1 to US1_TX9 in which different position information are included and analog components for capacitance information of the capacitors 1010 to 1050 may be included in the uplink signals transmitted from the adjacent touch electrodes TX3 to TX7, respectively. In other words, the uplink signals may include digital components and capacitance information.

In an embodiment, the position sensor 520 of the active pen may decode the uplink signals received from the adjacent driving electrodes TX3 to TX7, and calculate position information of the active pen by applying a predetermined algorithm. The position information of the active pen may be calculated from the digital components included in the uplink signals US1_TX1 to US1_TX9 in which different position information are included. For example, the position sensor 520 may calculate the position information of the active pen by estimating eigenvectors from the decoded uplink signals and allocating a predetermined relative weighted value to each of the eigenvectors.

However, although nine driving electrodes TX1 to TX9 have been described as an example in FIG. 10, the present disclosure is not limited to this number of driving electrodes. In addition, the descriptions of the driving electrodes may be equally applied to the sensing electrodes RX1 to RXN.

Figure 11:
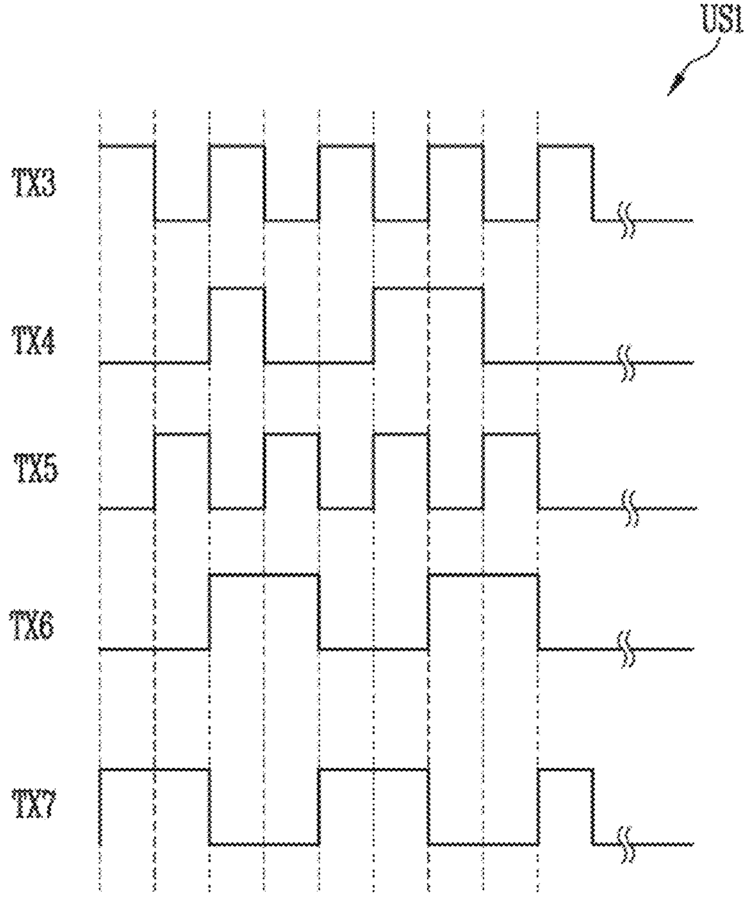
FIG. 11 is a timing diagram illustrating signals applied to some of touch electrodes shown in FIG. 10.

FIG. 11 is a timing diagram illustrating signals applied to some of the touch electrodes shown in FIG. 10.

Referring to FIG. 11, the uplink signals US1_TX3 to US1_TX7 respectively applied to the driving electrodes TX3 to TX7 adjacent to the external device shown in FIG. 10 will be described. The uplink signals may be signals of digital components, which are generated by performing encoding and modulation, based on different position information. The uplink signals may be different forms of pulse signals including 1 or 0 in a plurality of bit streams. For example, an uplink signal US1_TX3 applied to a driving electrode TX3 located on a third column may be a signal of a digital component, which includes 101010101. An uplink signal US1_TX4 applied to a driving electrode TX4 located on a fourth column may be a signal of a digital component, which includes 001001100. An uplink signal US1_TX5 applied to a driving electrode TX5 located on a fifth column may be a signal of a digital component, which includes 010101010. An uplink signal US1_TX6 applied to a driving electrode TX6 located on a sixth column may be a signal of a digital component, which includes 001100110. An uplink signal US1_TX7 applied to a driving electrode TX7 located on a seventh column may be a signal of a digital component, which includes 110011001. However, although an example in which the uplink signals include different position information is described, the present disclosure is not limited thereto.

Figure 12:
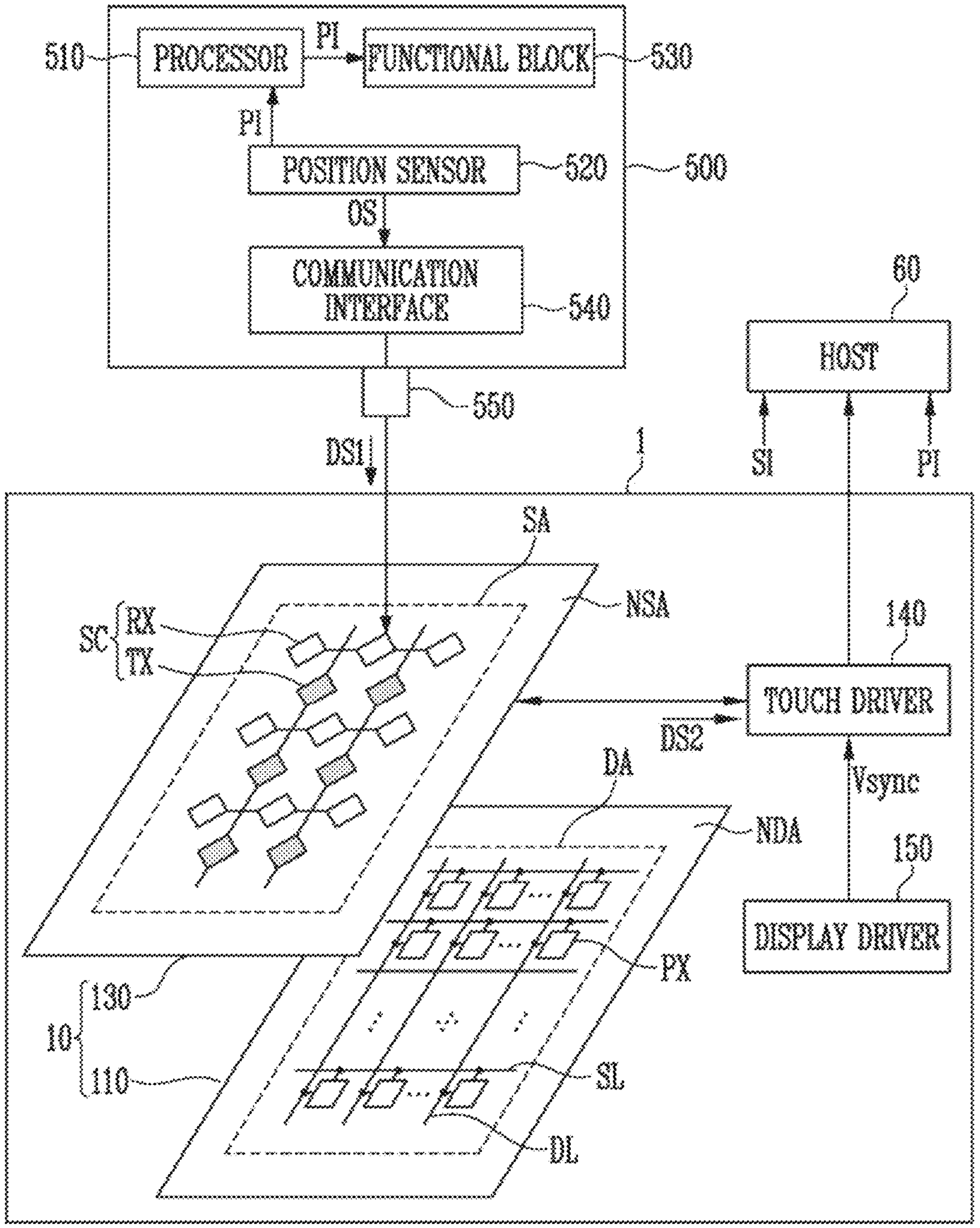
FIG. 12 is a block diagram illustrating processes in which a downlink signal is communicated in the display system shown in FIG. 5.

FIG. 12 is a block diagram illustrating processes in which a downlink signal is communicated in the display system shown in FIG. 5.

Referring to FIG. 12, the display device 1 may include a touch driver 140, a display driver 150, and a panel 10. The panel 10 may include a touch array 130 and a display panel 110. The touch array 130 may include sensing electrodes RX and driving electrodes TX. Hereinafter, descriptions of portions overlapping with those shown in FIGS. 5 and 6 will be omitted.

The position sensor 520 may calculate touch position information by decoding a signal received from the communication interface 540.

The processor 510 may receive position information PI from the position sensor 520. In embodiments, the processor 510 may transmit the received position information PI to the functional block 530.

The functional block 530 may perform several functions by using the received position information PI. For example, the functional block 530 may include a display module. The functional block 530 may visualize the received position information PI. In another example, the functional block 530 may include a motor for moving the external device 500 in a specific direction. The functional block 530 may allow the external device 500 to be moved by driving the motor according to the received position information PI.

In embodiments, the processor 510 may control the position sensor 520 and the communication interface 540 to transmit the position information PI in the form of a downlink signal DS1 to the display device 1. The position sensor 520 may provide the communication interface 540 with the position information PI in the form of an output signal OS.

The communication interface 540 may amplify the output signal OS and convert the amplified output signal OS into the downlink signal DS1. Additionally, the communication interface 540 may output the downlink signal DS1 to the touch array 130 through the receiving electrode 550. The display device 1 may receive the downlink signal DS1 through a touch electrode adjacent to the receiving electrode 550 among the sensing electrodes RX and the driving electrodes TX.

The touch driver 140 may receive a downlink signal DS2 through the touch array 130. The touch driver 140 may extract position information PI of the external device 500 by decoding the downlink signal DS2.

In embodiments, the downlink signal DS2 may further include state information SI associated with the external device 500. The touch driver 140 may further extract state information SI of the external device 500 by decoding the downlink signal DS2. In embodiments, when the external device 500 is an active pen, the state information SI may further include information on a button state of the active pen, a battery state, a slope of the active pen when the active pen is in contact with the touch array 130, and the like.

The touch driver 140 may transfer the extracted position information PI and the extracted state information SI to the host 60. In some embodiments, the display device 1 and the host 60 may perform wired communication with each other. In other embodiments, the display device 1 and the host 60 may perform wireless communication with each other.

Figure 13:
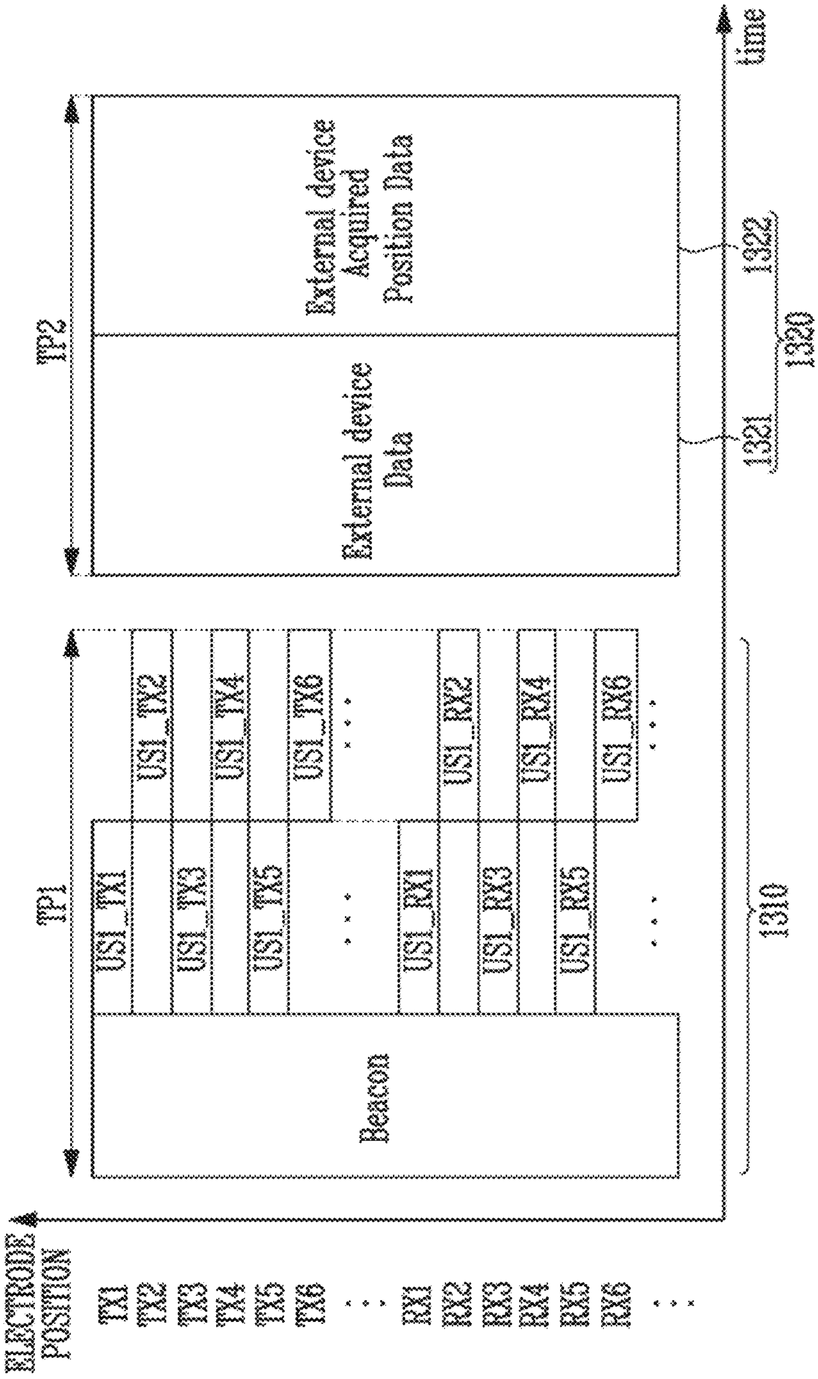
FIG. 13 is a timing diagram illustrating an embodiment of an uplink signal in a first time period and a downlink signal in a second time period.

FIG. 13 is a timing diagram illustrating an embodiment of an uplink signal in a first time period and a downlink signal in a second time period.

Referring to FIG. 13, communication between the display device 1 and the external device 500 may include a plurality of frames, and each frame may include a first time period TP1 in which uplink signals are transmitted and a second time period TP2 in which a downlink signal is transmitted.

As shown in FIG. 13, in the first time period TP1, uplink signals 1310 may be transmitted to the external device 500 through the touch array 130. In the second time period TP2 after the first time period TP1, a downlink signal 1320 may be transmitted from the external device 500 through the touch array 130. For example, the position sensor 520 of the external device 500 may calculate position information 1322 of the external device 500 by using the received uplink signals. In the second time period TP2, the position sensor 520 of the external device 500 may transmit, to the display device 1, a downline signal 1320 including the position information of the external device 500. The downlink signal 1320 may be transmitted through capacitors generated between the external device 500 and adjacent touch electrodes.

The downlink signal 1320 may include state information 1321 of the external device and the position information 1322 of the external device. For example, when the external device 500 is an active pen, the state information 1321 of the external device may include at least one of button information, battery information, information for error check and correction, and the like.

Figure 14:
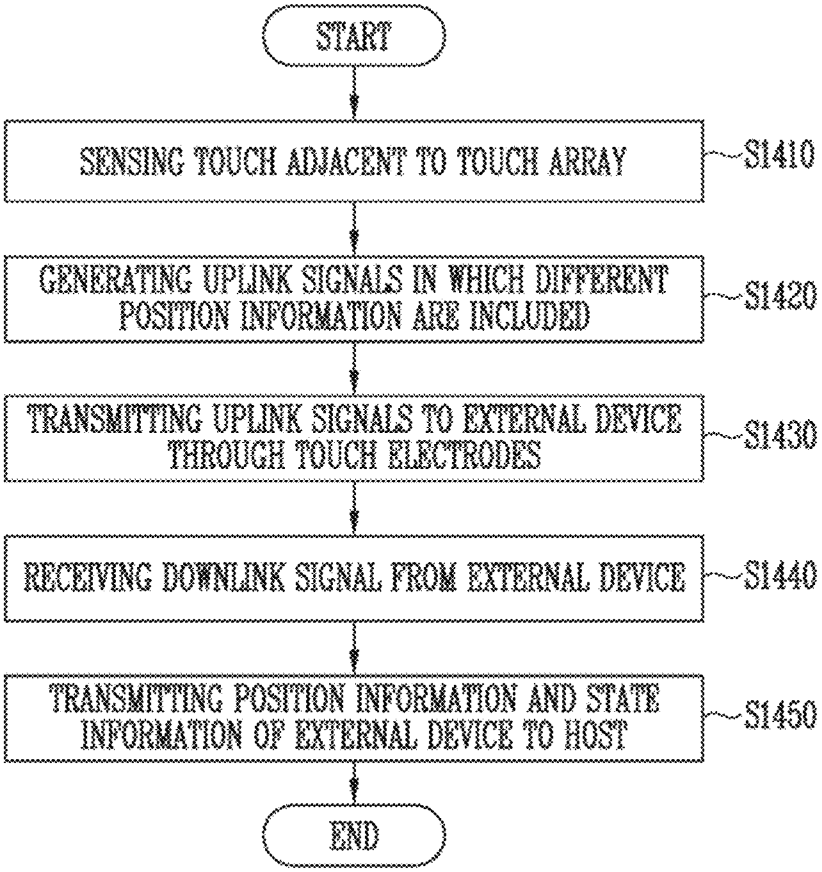
FIG. 14 is a flowchart illustrating a method of driving the display device in accordance with an embodiment of the present disclosure.

FIG. 14 is a flowchart illustrating a method of driving the display device in accordance with an embodiment of the present disclosure.

Referring to FIGS. 6 and 14, in S1410, a touch adjacent to the touch array 130 may be sensed.

In S1420, uplink signals US2 in which different position information are included may be generated. For example, data representing a position of each touch electrode may be encoded, thereby generating an encoded data signal US1. The encoded data signal US1 may further include information on the vertical synchronization signal Vsync, information on the panel 10, protocol version information, and the like.

In S1430, the uplink signals US2 may be transmitted to the external device 500 through the sensing electrodes RX and the driving electrodes TX.

In S1440, the display device 1 may receive position information PI of the external device 500 on the touch array 130, which is calculated by the external device 500, in the form of a downlink signal DS2.

In embodiments, the downlink signal DS2 may further include state information SI of the external device 500. For example, the external device 500 is an active pen, and the state information SI may further include information on a button state of the active pen, a battery state of the active pen, a slope of the active pen when the active pen is in contact with the touch array 130, and the like.

In S1450, the display device 1 may extract the position information PI of the external device 500 by decoding the downlink signal DS2. When the downlink signal DS2 further includes state information SI associated with the external device 500, the display device 1 may further extract state information SI of the external device 500 by decoding the downlink signal DS2. Additionally, the display device 1 may transfer the extracted position information PI and the extracted state information SI to the host 60. In some embodiments, the display device 1 and the host 60 may perform wired communication with each other. In other embodiments, the display device 1 and the host 60 may perform wireless communication with each other.

In accordance with the present disclosure, there is provided a display device, a method of driving the same, and a display system including the display device, which can efficiently and effectively acquire position information of an external device located above a display.

Although embodiments of the present disclosure have been set forth herein, they are to be interpreted in a generic and descriptive sense only and not for purpose of limitation. In some instances, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a touch array including a plurality of touch electrodes; and a touch driver configured to sense a touch adjacent to the touch array, wherein the touch driver transmits, to an external device, uplink signals through at least some of the touch electrodes in a first time period, and receives, from the external device, position information of the external device on the touch array in a second time period after the first time period, wherein the uplink signals are data signals having a digital component that represents a position of each of the at least some of the touch electrodes and an analog component associated with a capacitive coupling between the external device and the touch electrodes, the analog component comprising capacitance information, and wherein the position information of the external device is calculated by the external device, by applying a predetermined algorithm to the uplink signals.

2. The display device of claim 1, wherein the touch driver receives the position information of the external device as a downlink signal through at least some of the touch electrodes, and acquires the position information of the external device by decoding the downlink signal.

3. The display device of claim 2, wherein the external device is an active pen, and wherein the downlink signal further includes button state information of the active pen, slope information of the active pen, or battery state information of the active pen.

4. The display device of claim 1, wherein the touch driver is configured to communicate with a host, and wherein the touch driver transfers the position information of the external device to the host.

5. The display device of claim 1, wherein the touch electrodes include sensing electrodes arranged in a first direction and driving electrodes arranged in a second direction intersecting the first direction.

6. The display device of claim 5, wherein the touch driver generates the uplink signals by encoding position information corresponding to the sensing electrodes and the driving electrodes.

7. The display device of claim 1, wherein the touch driver transmits a first portion of the uplink signals to the external device through the touch electrodes in a first sub-time period of the first time period, and transmits a second portion of the uplink signals to the external device through the touch electrodes in a second sub-time period of the first time period.

8. A method of driving a display device including a touch array, the method comprising:

sensing a touch adjacent to the touch array;

transmitting, to an external device, uplink signals through touch electrodes of the touch array in a first time period, wherein the uplink signals are data signals having a digital component that represents a position of each of the touch electrodes and an analog component associated with a capacitive coupling between the external device and the touch electrodes, the analog component comprising capacitance information; and receiving, from the external device, position information of the external device on the touch array, in a second time period after the first time period, wherein the position information of the external device on the touch array is calculated by the external device by applying a predetermined algorithm to the uplink signals.

9. The method of claim 8, wherein the receiving includes:

receiving the position information of the external device as a downlink signal through at least some of the touch electrodes; and acquiring the position information of the external device by decoding the downlink signal.

10. The method of claim 9, wherein the external device is an active pen, and wherein the downlink signal further includes button state information of the active pen, slope information of the active pen, or battery state information of the active pen.

11. The method of claim 8, further comprising transferring the position information of the external device to a host.

12. The method of claim 8, wherein the touch electrodes include sensing electrodes arranged in a first direction and driving electrodes arranged in a second direction intersecting the first direction, and wherein, in the transmitting, the uplink signals are generated by encoding position information corresponding to the sensing electrodes and the driving electrodes.

13. The method of claim 8, wherein the transmitting includes:

transmitting a first portion of the uplink signals to the external device through the touch electrodes in a first sub-time period of the first time period; and transmitting a second portion of the uplink signals to the external device through the touch electrodes in a second sub-time period of the first time period.

14. An electronic system comprising:

a display device including a touch array including a plurality of touch electrodes and a touch driver configured to sense a touch adjacent to the touch array; and an external device configured to communicate with the display device through the touch array, wherein the touch driver:

transmits, to the external device, uplink signals through one or more capacitors generated between at least some of the touch electrodes and the external device when the external device is adjacent to the touch array in a first time period, wherein the uplink signals have a digital component that represents a position of each of the at least some of the touch electrodes and an analog component associated with a capacitive coupling between the external device and the touch electrodes, the analog component comprising capacitance information; and receives, from the external device, a downlink signal including position information of the external device in a second time period after the first time period, and wherein the external device includes a position sensor configured to calculate the position information of the external device on the touch array, by applying a predetermined algorithm to the uplink signals.

15. The electronic system of claim 14, wherein the touch driver generates the uplink signals by encoding position information of the touch electrodes, wherein the external device receives the uplink signals from touch electrodes adjacent to the external device among the touch electrodes, and wherein the position sensor calculates the position information of the external device by decoding the received uplink signals.

16. The electronic system of claim 14, wherein the touch driver provides the position information of the external device to a host.

17. The electronic system of claim 16, wherein the touch driver further provides state information of the external device to the host.

18. The electronic system of claim 14, wherein the touch array overlaps a display panel of the display system.

19. The electronic system of claim 14, wherein the external device further includes a processor and a functional block, the functional block being configured to visualize the position information of the external device on the touch array.

20. The electronic system of claim 19, wherein the functional block includes a motor to move the external device.

* * * * *